June 20, 1967 G. MÜLLER 3,326,070

TOOL POST AND TOOL HOLDER

Filed Dec. 14, 1964

Georg Müller
INVENTOR

BY Werner W. Kleeman
His Attorney

United States Patent Office 3,326,070
Patented June 20, 1967

3,326,070
TOOL POST AND TOOL HOLDER
Georg Müller, Uznach, Switzerland
Filed Dec. 14, 1964, Ser. No. 418,029
Claims priority, application Switzerland, Dec. 21, 1963, 15,575/63
13 Claims. (Cl. 82—36)

The present invention has reference to an improved tool post and tool holder of the type employed, by way of example, for holding a cutting tool or the like in a desired position on a lathe relative to the work.

Different physical constructions of lathe tool apparatuses incorporating exchangeable lathe tool holders are already known to the art. Generally, such are based upon the principle that the exchangeable tool holder is pulled or pressed against a base element fixedly seated upon the tool carrier by means of the force of an eccentric, in other words to provide a force-locking or positive connection.

A primary object of the present invention is the provision of an improved tool post and holder assembly which enables the tool to be positively adjusted in a great number of different positions and to be fixedly held in positive manner at the requisite position for processing the work.

Another very important object of the present invention is the provision of an improved lathe tool-exchangeable holder mechanism wherein the exchangeable holder for holding the lathe tool is constructed such that it completely encircles a plug-like base element stationarily mounted upon the tool carriage of the lathe.

Still a further noteworthy object of this invention is the provision of an improved tool post and tool holder assembly which permits positively securing the tool holder in a given one of a plurality of possible tool positions.

A still further very important object of this invention relates to the provision of an improved tool post and tool holder assembly wherein the tool holder incorporates a split sleeve member having a bore capable of being slidably fitted over the tool post, the diameter of the bore being substantially the same size as, or slightly smaller than, the outer diameter of the tool post, so that a press fit between the tool post and tool holder exists when the latter is in its normal position, in other words is neither expanded or contracted.

An additional object of this invention relates to the provision of a tool post and tool holder assembly incorporating means for expanding and pulling together the tool holder to provide a form-locking connection with the tool post, and further, to provide means for ensuring that a flank of a guide nose first comes to bear at a confronting face of an associated guide groove, to thereby initially fix the angular position of the tool holder at the tool post prior to fixedly interconnecting such tool holder with the tool post.

Yet a further considerable object of this invention concerns itself with an improved tool post and tool holder assembly incorporating novel means for securing the tool post to the carriage of the tool machine, such as a lathe, particularly to avoid warping or stressing such carriage.

The tool post and tool holder assembly of the present invention is generally manifested by the features that the exchangeable tool holder for holding the lathe tool is constructed such that it completely encircles a pin- or plug-like base element providing the tool post which is seated upon the carriage of the lathe, and that clamping eccentric means or the like are provided in order to change the diameter of the bore of the exchangeable tool holder through which piercingly extends the tool post.

More specifically, the tool holder is advantageously constructed as a split member permitting expansion and contraction thereof by means of a suitable mechanism. The aforesaid diameter of the bore is formed the same size as, or slightly smaller than, the outer diameter of the tool post, so that a press fit exists between such members when the tool holder is in normal position, i.e. neither expanded nor contracted. Also, in order to facilitate setting of the angular position of the tool holder upon the tool post the latter is provided with a number of axially extending guide grooves at its surface into which extends, preferably with considerable play, a guide nose of the tool holder. To compensate for such play there is provided entraining means which force a flank of the guide nose against the confronting face of the guide groove into which said nose extends. Advantageously, the entraining means can be actuated from the same lever used to expand and tighten the tool holder, so that fixing of the latter upon the tool post can be carried out during a single operation of the lever.

According to a further aspect of this invention there is provided an improved construction of the stay bolt or equivalent fastening mechanism for fixing the tool post upon the carriage without stressing or warping the latter. A further feature of the invention provides a removable support plate capable of being detachably fitted into the tool receiving-recess of the tool holder, so that cutting tools possessing substantially circular shanks can also be used with the same tool holder.

Other features, objects and advantages of the invention will become apparent by reference to the following detailed description and drawing in which:

FIGURE 1 schematically illustrates a first embodiment of tool post and tool holder assembly of the present invention, shown in elevational cross-section;

Figure 1:
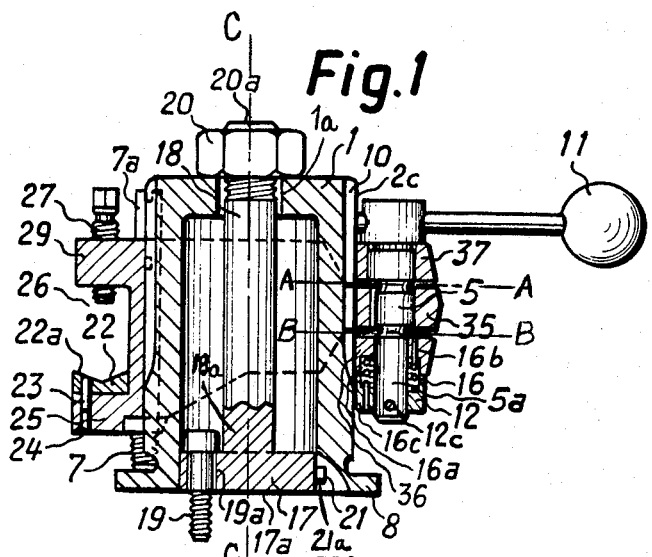
Figure 2:
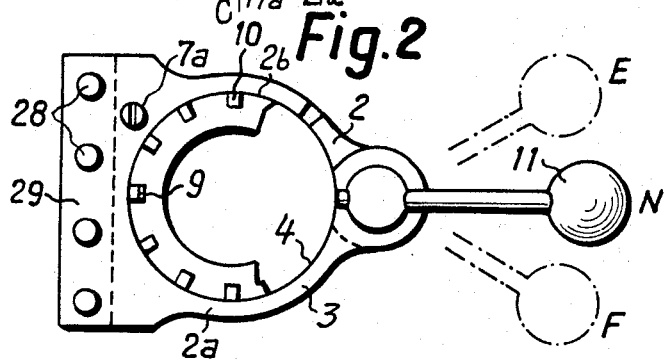
FIGURE 2 is a top plan view of the tool post and tool holder assembly of FIGURE 1.

Describing now the drawing and, more particularly directing attention to FIGURES 1 and 2, it will be seen that the therein illustrated tool post and tool holder assembly of the invention comprises an upright, plug-like base element providing a tool post 1 of substantially cylindrical shape and an exchangeable, expandable tool holder 2 in the form of a split casing clamp or split sleeve 2a provided with a substantially cylindrical bore 4 which can be slipped onto the upright tool post 1.

It will be seen the tool holder 2 completely encircles the tool post 1, the diameter of the bore 4 of said tool holder being substantially the same or slightly smaller than the outer diameter of the tool post 1. In other words, when the tool holder 2 is in its normal position, that is, neither expanded or contracted, there is substantially provided a press fit between such tool holder 2 and tool post 1, so that after contracting or tightening of said tool holder 2 about the tool post 1, by mechanism to be considered shortly, there results a form-locking connection of great rigidity between these members 1 and 2. Due to the fact that the diameter of bore 4 is made substantially the same, as a practical matter somewhat smaller than, the diameter of the tool post 1, to provide the aforementioned press fit, the walls 2b of the bore 4 snugly contact the outer walls 2c of the tool post 1 in form-locking manner.

Furthermore, this tool holder 2 is provided with a rerecess 26 extending throughout the length of said tool holder which is adapted to receive the non-illustrated requisite cutting tool. This tool-receiving recess 26 is shown, by way of example, to be of substantially U-shaped cross-section, the tool capable of being positioned therein and, for instance, assumed to have a rectangular or square shank, can be fixedly retained by means of a number of setting or holding screws 27 threadably passing through threaded bores 28 formed at an upper leg 29 of tool holder 2. According to one of the features of this invention, a prism-shaped tool carrier or support plate 22, substantially V-shaped in cross-section, can be detachably mounted upon lower leg or ledge 25 of the tool holder 2, so that with the same tool holder it is also possible to use tools with, for instance, substantially circular or round shanks which then bear against the V-shaped support surface 22a of support plate 22. It will be clearly seen by inspecting FIGURE 1 the support plate 22 fixedly carries thereat pin means 23 insertable in suitable holes 24 provided at the lower leg 25 of the tool holder 2.

It should be appreciated that the angular or lateral position of the tool holder can be directly determined by the cross-sectional form of the tool post and the bore in the tool holder into which said tool post fits (e.g. quadrangular, hexagonal cross-sections and so forth, provision of teeth means, etc.). In the case of the illustrated embodiment employing a substantially cylindrical tool post 1, such is provided at its outer surface with a number of spaced, axially extending guide grooves 10 adapted to receive a guide nose 9 carried by the wall 2b of the bore 4 of the tool holder 2. Thus, when the tool holder 2 is properly expanded by actuating the manual operable lever 11 to achieve the necessary play it is possible to slip such over the tool post 1. By turning this tool holder 2 until reaching a desired angular position about the tool post 1, the guide nose 9 can be moved into a given one of the lengthwise extending guide slots 10. Thereafter, the manually operable lever or handle 11 is rotated in a direction for tightening the tool holder 2 in form-locking manner about the outer surface 2c of the tool post 1.

It will be recalled, the tool holder 2 is constructed as a split sleeve 2a capable of being expanded and contracted about the tool post 1, and that in the normal position of this tool holder 2 such substantially provides a press fit with the tool post 1 by virtue of the described dimensioning of the diameter of the tool holder bore 4 and the outer diameter of the tool post 1.

Considering now further physical structure of the tool holder 2 it will be seen that, in the illustrated embodiment, such is split at a location opposite the tool receiving recess 26, more specifically, in two substantially spaced parallel planes A—A and B—B extending substantially perpendicular to the lengthwise axis C—C of the tool post 1. As a result, at the parting planes A—A and B—B of the tool holder 2 there is formed at one side of the sleeve 2a of said tool holder a lug or flange 35 which is straddled by two spaced and confronting lugs or flanges 36, 37 provided at the other side of said tool holder 2. Due to this described physical structure of the tool holder 2 such can be appropriately expanded in order to generate the play necessary to slip it onto the tool post 1 and, thereafter, can be contracted or tightened in order to be fixedly secured thereon.

Now, in order to be able to expand and contract such tool holder there is provided an appropriate mechanism which, in the embodiment of FIGURE 1, embodies an eccentric shaft 5a carrying an eccentric 5, here shown positioned to cooperate with the central lug 35 of the tool holder 2. This eccentric shaft 5a can be appropriately rotated by means of the manually operable lever 11 extending radially of the tool holder 2. Referring to FIGURE 2, it will be assumed that the tool holder 2 is expanded when the lever 11 is moved into the phantom-line position designated by reference character E from the so-called neutral position N shown in full-lines, and when such lever is moved in the direction of the phantom-line position designated by reference character F the tool holder 2 is contracted, that is, can be securely tightened about the tool post 1.

By further referring to FIGURE 1 it will be seen that an adjusting ring or set collar 12 is connected at 12c with the lower end of the eccentric shaft 5a. This adjusting ring 12 together with the flange or lug 36 of the tool holder 2 is formed to provide a recess 16a housing a torsion spring 16, one end 16b of which is connected with the flange 36, the other end 16c with the aforesaid adjusting ring 12. Such construction provides an entrainment mechanism for applying a moment of rotation at the tool holder 2 when the manual lever 11 is moved from the position E, where the tool holder 2 is expanded, into the position F where it is contracted. Due to this moment of rotation the flank 9a of the nose 9 is first brought to bear against the confronting flank or face 10a of the associated guide groove 10, so that the lateral or angular position of the tool holder 2 is initially fixed and, thereafter, rigidly fixed when such tool holder 2 is tightly clamped about the tool post 1. This occurring when the manual lever 11 is shifted towards position F.

Due to this entrainment mechanism it is possible to construct the guide nose 9 to be considerably smaller than the guide grooves 10, thereby facilitating insertion of such nose 9 in its associated guide groove 10 when the tool holder 2 is placed onto the tool post 1. Hence, this entrainment mechanism eliminates the necessity of an exact dimensioning or otherwise complicated construction of such guide nose 9 with respect to the guide grooves 10, and the greater play between these elements 9, 10 facilitates assembly of the tool holder 2 upon the tool post 1. Thereafter, the aforedescribed entrainment mechanism removes such play by bringing the flank 9a of this guide nose 9 into snug contact with the face 10a of the associated guide groove 10. It should also be appreciated that the actuating lever 11 is advantageously rotated in the same direction for effecting operation of the entrainment mechanism and the eccentric 5 to tighten the tool holder 2, so that a single manipulation of this lever 11 in a single direction is sufficient to angularly fix the nose 9 in its groove 10 and for securely clamping the tool holder 2 onto the tool post 1. Moreover, the entraining mechanism, due to the action of the spring 16 assists in keeping the tool holder 2 in its expanded position when the lever 11 is moved to position E since it acts upon the eccentric shaft 5a.

Figure 3:
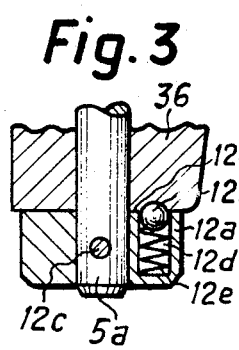
FIGURE 3 is an enlarged fragmentary, cross-sectional view of a modified form of entrainment mechanism for the tool holder of FIGURE 1.

Naturally, instead of the resilient entrainment mechanism of FIGURE 1 employing the torsion spring 16, other physical constructions are possible. Thus, for example, in FIGURE 3 the entrainment mechanism incorporates an adjusting ring or collar 12a connected with the eccentric shaft 5a, at 12c. This adjusting ring 12a is provided with a groove 12d in which is seated a spring 12e acting against a spherical ball member 12f engaging with a groove 12g provided at the underface of the flange or lug 36 of the tool holder 2. It will be appreciated that, just as previously described, the spherical ball member 12f which is subjected to the action of the spring 12e entrains the nose 9 of the tool holder 2, so that its flank 9a contacts the confronting face 10a of the associated guide groove 10. In place of this spherical ball member 12f there can also be employed a friction bolt which bears against the smooth surface of the tool holder 2 and generates frictional resistance.

Figure 4:
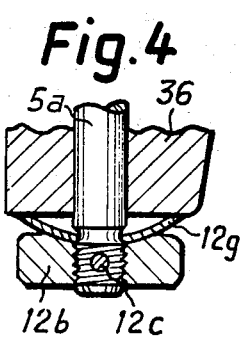
FIGURE 4 illustrates in enlarged fragmentary, cross-sectional view a further variant of entrainment mechanism for the tool holder of FIGURE 1.
Figure 5:
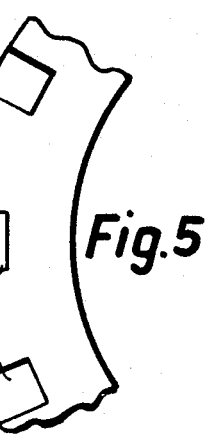
FIGURE 5 is a fragmentary view showing a detail of the tool post and tool holder.

In FIGURE 4 the entrainment mechanism incorporates a resilient or elastic disk 12g arranged between an adjusting ring or collar 12b connected at 12c with the eccentric shaft 5a and the flange 36 of the tool holder 2. It is to be understood that the various embodiments of entrainment mechanisms disclosed herein ensure that the play between the guide nose 9 and the guide grooves 10, whether such play results from the construction or from wear, does not have any effect upon the precision of the lateral or angular position of the tool holder 2 relative to the tool post 1.

Additionally, it will also be recognized by inspecting FIGURE 1 that the tool holder 2 is provided with a throughpassing threaded bore 7a through which extends a threaded screw or spindle 7 adapted to bear upon radial flange or shoulder means 8 provided at the base of the tool post 1 in order that the elevational position of the tool holder 2 along the tool post 1 can be regulated. This flange means 8 also advantageously increases the stability of the tool post 1 which is fastened upon the tool carriage. Naturally, the threaded spindle or screw 7 could also bear against the carriage.

Moreover, instead of employing an eccentric mechanism for expanding and contracting the split tool holder 2, other physical constructions suitable for this purpose can be used.

According to a further aspect of this invention a stay bolt 18 or equivalent expedient, by means of which the tool post 1 is attached to the carriage of the lathe, is not connected in the usual manner with such carriage by means of threading provided at the lower end of such stay bolt, this generally leading to stresses and warping of the carriage with such prior art attachment arrangements. Rather in this embodiment, the lower end 18a of the stay bolt 18 is provided with a flange 17. Screw means 19 or equivalent fastening members pass through suitable bores 19a provided at the flange 17, so that the tool post 1 can be connected via these screw means 19 with the carriage. It will also be recognized that the tool post 1 is internally provided with a throughpassing axial bore 1a for receiving the stay bolt 18 including its flange portion 17. The upper end 20a of the stay bolt 18 is threaded to receive a nut 20 in order to axially fix the tool post 1. Moreover, if the flange 17 is worked so as to be exactly planar at its support surface 17a, then even when the screw means 19 are strongly tightened a distortion or warping of the tool carriage is impossible. It will be evident upon inspecting FIGURE 3, the flange 17 can be utilized to radially or angularly guide and position the tool post 1 in that, a nose 21 projecting from the aforesaid flange 17 comes to rest in a suitable recess 21a provided at said tool post 1.

The cylindrical configuration of the tool post 1 and the cylindrical bore 4 provided at the tool holder 2, in addition to the simpler production of such members, also provides the possibility of forming a relatively large number of guide grooves 10 in the tool post 1, for example twenty-four such grooves at 15° spacing from one another, corresponding to the same number of possible positions of the tool holder 2.

It would also be conceivable to make the sleeve member 2a of the tool holder 2 non-split and non-displaceable, that is, in the form of a closed collar, while the tool post which corresponds in form to the shape of the bore in the exchangeable tool holder 2 is displaceable i.e. expandable and contractible in order that a tight, form-locking connection between such tool holder and the tool post is possible.

While there is shown and described present preferred embodiments of the invention it is to be distinctly understood that the invention is not limited thereto but may be otherwise variously embodied and practised within the scope of the following claims.

What is claimed is:

1. A tool post and tool holder assembly comprising a substantially cylindrical tool post member, a split tool holder member having a substantially cylindrical bore through which passes said substantially cylindrical tool post member, the diameter of said substantially cylindrical bore at most being equal to the outer diameter of said substantially cylindrical tool post member receiving said split tool holder member, said tool holder member when mounted upon said tool post member completely encircling the latter, an elevationally displaceable screw member carried by said split tool holder members for regulating and fixing the elevational position of said split tool holder member relative to said tool post member, said split tool holder member being formed of a single piece and provided with means for receiving a tool, said split tool holder member comprising a split sleeve having flange means at one side of said split sleeve straddled by two spaced and confronting flange means provided at the othr side of said split sleeve, said flange means being disposed at a substantially diametrically opposed location to said means for receiving a tool, said flange means being provided with aligned bores, means for opening and closing said split tool holder member in order to be able to slip said split tool holder member onto said tool post member and then to fixedly clamp said split tool holder member at such tool post member, said opening and closing means including eccentric means extending through said aligned bores of said flange means, one of said members having at least one longitudinal guide groove, the other of said members having a guide nose engaging with said longitudinal guide groove, and means cooperating with said opening and closing means for urging a face of said guide groove against the confronting face of said guide nose.

2. A tool post and tool holder assembly as defined in claim 1, said split tool holder member being provided with a threaded bore, said screw member being receivable in said threaded bore for fixing the elevational position of said split tool holder member along said tool post member.

3. A tool post and tool holder assembly as defined in claim 2, said tool post member including radial flange means provided at the lower end thereof, said threaded screw bearing upon said radial flange means.

4. A tool post and tool holder assembly as defined in claim 1, wherein a plurality of longitudinally extending guide grooves are provided at the circumference of said tool post member for determining the angular position of said split tool holder member.

5. A tool post and tool holder assembly as defined in claim 4, wherein said guide nose is carried by said split tool holder member and extends into said cylindrical bore.

6. A tool post and tool holder assembly comprising a tool post incorporating an upright substantially cylindrical body, a split tool holder having a bore through which passes said tool post, said bore of said split tool holder being substantially cylindrical, the diameter of said substantially cylindrical bore at most being equal to the outer diameter of said substantially cylindrical tool post receiving said split tool holder, said tool holder when mounted upon said tool post completely encircling the latter, a plurality of axially extending guide grooves provided at the circumference of said tool post for determining the angular position of said split tool holder, a guide nose engageable with said guide grooves carried by said split tool holder and extending into said cylindrical bore, entrainment means for forcing a flank of said guide nose against a confronting face of a guide groove into which said guide nose extends, and means for opening and closing said split tool holder in order to be able to slip said split tool holder onto said tool post and then to fixedly clamp said split tool holder at such tool post.

7. A tool post and tool holder assembly as defined in claim 6, said entrainment means incorporating spring means.

8. A tool post and tool holder assembly as defined in claim 7, said entrainment means further including a ball member acted upon by said spring means.

9. A tool post and tool holder assembly as defined in claim 6, said entrainment means incorporating a resilient disk member acting against said split tool holder.

10. A tool post and tool holder assembly comprising a tool post, a split tool holder having a bore through which passes said tool post, the diameter of said bore at most being equal to the outer diameter of said tool post receiving said split tool holder, said tool holder when mounted upon said tool post completely encircling the latter, means for opening and closing said split tool holder in order to be able to slip said split tool holder onto said tool post and then to fixedly clamp said split tool holder at such tool post, and entrainment means for angularly shifting said split tool holder about said tool post.

11. A tool post and tool holder assembly as defined in claim 1, including means for connecting said tool post member with a carriage, said connecting means incorporating a stay bolt provided with flange means, and fastening means for fixing said flange means with said carrriage.

12. A tool post and tool holder assembly as defined in claim 11, said tool post member being provided with a recess, said flange means being provided with a nose member projecting into said recess.

13. A tool post and tool holder assembly comprising a tool post incorporating an upright substantially cylindrical body, a split tool holder having a bore through which passes said tool post, said bore of said split tool holder being substantially cylindrical, the diameter of said substantially cylindrical bore at most being equal to the outer diameter of said substantially cylindrical tool post receiving said split tool holder, said tool holder when mounted upon said tool post completely encircling the latter, said split tool holder being provided with means for receiving a tool and a threaded bore, a threaded screw member receivable in said threaded bore for fixing the elevational position of said split tool holder along said tool post, said tool post including radial flange means provided at the lower end thereof, said threaded screw bearing upon said radial flange means, a plurality of axially extending guide grooves provided at the circumference of said tool post for determining the angular position of said split tool holder, a single radially extending guide nose engageable with play with said guide grooves carried by said split tool holder in the region of said tool-receiving means and extending into said cylindrical bore, entrainment means including a spring member for forcing a flank of said guide nose against a confronting face of a guide groove into which said guide nose extends, and means for opening and closing said split tool holder in order to be able to slip said split tool holder onto said tool post and then to fixedly clamp said split tool holder at such tool post, said opening and closing means incorporating an actuating lever respectively movable between an opening and closing position for said split tool holder, said spring member being biased to urge said actuating lever into said opening position.

References Cited

UNITED STATES PATENTS

| | | | |
|---|---|---|---|
| 2,428,508 | 10/1947 | Weigle et al. | 82—37 |
| 2,763,176 | 9/1956 | Chartier et al. | 82—36 |
| 2,878,705 | 3/1959 | Hirvonen | 82—36 |

FOREIGN PATENTS

| | | |
|---|---|---|
| 284,520 | 11/1952 | Switzerland. |
| 324,395 | 10/1957 | Switzerland. |
| 1,230,847 | 4/1960 | France. |

WILLIAM W. DYER, JR., *Primary Examiner.*

LEONIDAS VLACHOS, *Examiner.*